B. F. HILDEBRAND.
NUT LOCKING WASHER.
APPLICATION FILED MAY 17, 1916.
1,227,265. Patented May 22, 1917.
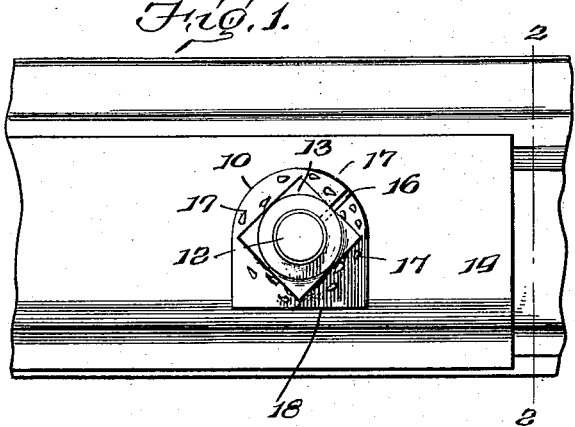
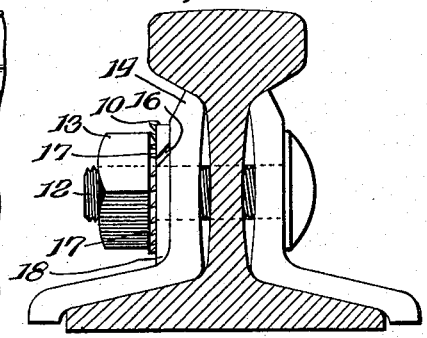
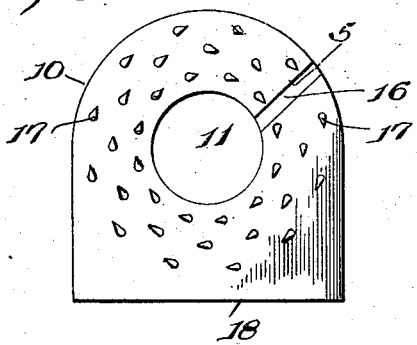
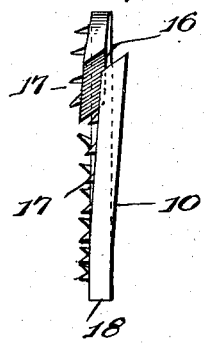
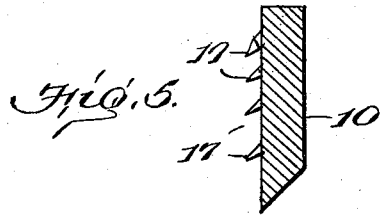
Inventor
B. F. Hildebrand
By
Attorneys

UNITED STATES PATENT OFFICE.

BENJAMIN F. HILDEBRAND, OF AGNEW, CALIFORNIA.

NUT-LOCKING WASHER.

1,227,265.  Specification of Letters Patent.  Patented May 22, 1917.

Application filed May 17, 1916. Serial No. 98,129.

*To all whom it may concern:*

Be it known that I, BENJAMIN F. HILDEBRAND, a citizen of the United States, residing at Agnew, in the county of Santa Clara and State of California, have invented certain new and useful Improvements in Nut-Locking Washers, of which the following is a specification.

This invention relates to improvements in nut locks employed for preventing retrograde movement of nuts upon bolts, and has for one of its objects to improve the construction and increase the efficiency and utility of devices of this character.

Another object of the invention is to provide a simply constructed device, efficient in operation and which does not require any change in the bolt or the nut.

With these and other objects in view, the invention consists in certain novel features of construction, as hereinafter shown and described and then specifically pointed out in the claims.

The improved device may be applied to nuts and bolts of various sizes and to bolts and nuts employed for various purposes, but the improved device is more specifically adapted for use in connection with the clamp bolts of railway rail joints, and for the purpose of illustration is shown thus applied, and in the drawings illustrating the preferred embodiment of the invention—

Figure 1 is a side elevation of a portion of a conventional railway rail joint including one of the clamp bolts with the improvement applied;

Fig. 2 is a transverse section on the line 2—2 of Fig. 1;

Fig. 3 is an enlarged elevation of the improved nut lock member;

Fig. 4 is an edge view of the device as shown in Fig. 3;

Fig. 5 is an enlarged sectional detail on the line 5—5 of Fig. 3.

Corresponding and like parts are referred to in the following description and indicated in all the views of the drawings by the same reference characters.

The improved device comprises a plate represented as a whole at 10 and formed with a central aperture, indicated at 11, and adapted to engage around a bolt 12 between the nut 13 and the body 14, for instance a clamp plate of a railway rail joint. The member 10 is split at one side, as indicated at 16, and initially twisted with the parts adjacent to the split 16 separated, as illustrated in Fig. 4. The split 16 is formed obliquely to the plane of the plate or washer 10 with the parts interlapping, as shown, and the split is in the upper portion of the washer or above the central axis of the bolt aperture. One face of the washer 10 is provided with a plurality of spurs indicated conventionally at 17, the spurs being preferably of hardened steel and pointed, as illustrated in Fig. 5, the spurs being also arranged staggering, as shown in Fig. 3. The studs or spurs extend at an angle to the face of the washer and point in the same general direction. The plate or washer 10 is extended at one edge, as shown at 18. The improved device is furnished to the railway companies or others who are to use it in the forms shown in Figs. 3 and 4 with the split side twisted, and is disposed upon the bolt 12 before the nut is applied with the spurs 17 outwardly and the flat lower terminal 18 bearing upon the offset portion of the member 14 which effectually prevents the rotation of the washer 10 upon the bolt. When the nut 13 is applied and turned "home" by the wrench or other implement the twisted portion of the washer is forced into alinement with the plate 14 and the nut and caused to assume the position shown in Fig. 2, the spurs 17 being embedded in the inner face of the nut and effectually locking the latter upon the bolt and preventing retrograde movement under the severe jars to which such nuts are subjected by the rolling stock.

The washer 10 may be of any required size and strength, but will be sufficiently heavy to withstand the strains to which it will be subjected when in use.

Having thus described the invention, what is claimed as new is:

1. A nut locking washer comprising a flat body portion having a bolt receiving opening and provided with a cleft extending from the outer edge of the body portion to said bolt receiving opening, the walls of the cleft being undercut and the body portion at each side of said cleft being bent in opposite directions, and a plurality of nut engaging pins extending laterally from one side of the body portion around the bolt receiving opening and inclined with respect to said side, all of the pins being inclined in the same direction and provided with pointed terminals.

2. A nut locking washer comprising a flat body portion provided with a bolt receiving opening and having one end thereof flat and its other end curved, said body portion being provided with a diagonal cleft extending from the bolt receiving opening to the outer edge of the body portion at the curved end thereof, the walls of the cleft being undercut and the body portion at each side of the cleft being bent in opposite directions, and a plurality of nut engaging pins arranged in concentric rows around the bolt receiving opening on one side of the body portion and inclined with respect to said side, the pins of one row being disposed in staggered relation with respect to the pins of an adjacent row and all of said pins being provided with conical terminals inclined in the same direction.

In testimony whereof I affix my signature.

BENJAMIN F. HILDEBRAND. [L. S.]

Copies of this patent may be obtained for five cents each, by addressing the "Commissioner of Patents, Washington, D. C."